E. WEINTRAUB.
PROCESS OF MAKING BORON SUBOXID.
APPLICATION FILED MAY 2, 1913.
1,105,388.
Patented July 28, 1914.
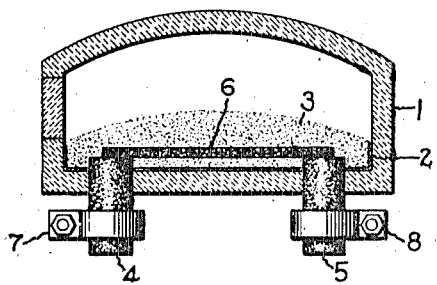
Witnesses:
Irving E. Steers.
J. Ellis Glenn.
Inventor
Ezechiel Weintraub
by
His Attorney.

UNITED STATES PATENT OFFICE.

EZECHIEL WEINTRAUB, OF LYNN, MASSACHUSETTS, ASSIGNOR TO GENERAL ELECTRIC COMPANY, A CORPORATION OF NEW YORK.

PROCESS OF MAKING BORON SUBOXID.

1,105,388. Specification of Letters Patent. Patented July 28, 1914.

Application filed May 2, 1913. Serial No. 764,981.

*To all whom it may concern:*

Be it known that I, EZECHIEL WEINTRAUB, a citizen of the United States, residing at Lynn, county of Essex, State of Massachusetts, have invented certain new and useful Improvements in Processes of Making Boron Suboxid, of which the following is a specification.

My present invention comprises a new process of producing boron suboxid, a chestnut brown powder commonly referred to as "amorphous boron" in the chemical literature.

In accordance with my invention, a reaction is produced between a borate, such, for example, as ordinary borax, $Na_2B_4O_7$, and an oxidizable silicon material, such as elemental silicon, or the monoxid of silicon.

The accompanying drawing illustrates one form of apparatus for carrying out my invention.

In accordance with the preferred form of my process, about seven to eight parts of borax, or other suitable borate, and about one part of silicon are used, although I do not wish to be limited to these particular proportions. The material is pulverized, thoroughly mixed, and is then placed in a suitable retort.

One form of retort or furnace is shown in the drawing as comprising a refractory container 1, consisting of fire brick or other suitable material, the container preferably being lined with a layer of paper 2 so as to allow an easy separation of the charge 3 from the walls of the container. The furnace is provided with graphite electrodes 4, 5, projecting through the floor of the furnace into contact with the charge. In order to start the current at a relatively low voltage, a graphite rod 6 may be used to connect the two electrodes. In some cases a core in contact with the electrode and consisting of relatively coarse pieces of silicon may be used for the same purpose. I have found that even when the furnace consists of brick loosely put together without cementing material, that the charge does not escape when molten even when the lining of paper is omitted. The furnace may be operated by connecting the electrode contacts 7, 8 to a source of energy of suitable voltage, and so regulating the current that the temperature is maintained near the boiling point of the mixture. In some cases it is preferable to maintain the temperature somewhat below the boiling point of the charge until near the end of the reaction and then raising it to the boiling point for five to ten minutes before discontinuing the heating. The completion of the reaction usually requires from one to two hours. After the furnace is cooled, it may be dismantled and the charge, consisting of a brown glassy mass, is crushed.

In order to dissolve uncombined silicon and also prevent the hydrolysis of the sodium, or other alkali silicate, during the purification of the charge, I prefer to treat the crushed product with a solution of caustic alkali, such as sodium hydroxid. During the first stages of the purifying process, for example, the crushed metal may be boiled with about ten times its own weight of .25% sodium hydroxid solution. Uncombined silicon is thereby dissolved, and by-products, such as sodium silicate, washed out. The residue from the treatment is then treated with 1% sodium hydroxid solution and finally with one-half of this volume of a 1 to 2% sodium hydroxid solution until all the free silicon is dissolved, as indicated by the cessation of hydrogen bubbles. Thereupon the washing is continued with water, or by dilute acids, followed with water, until all the soluble impurities have been removed. The same process may be carried out by heating the mixture externally to the reaction temperature in a suitable crucible, such as a Battersea crucible, or a Dixon clay-lined crucible, the crucible being preferably lined with several thicknesses of paper. The crucible charge may be heated in a suitable combustion furnace, or electric furnace, such as a resistance furnace, containing a crushed charge of carbon, or similar refractory conductor.

The final product is a brown, insoluble amorphous powder, consisting of boron and oxygen vaporizable without fusion and having the probable formula $B_7O$. From it elemental boron may be prepared by heating to a very high temperature according to the process described in my Patent No. 1,019,392.

What I claim as new and desire to secure by Letters Patent of the United States, is,—

1. The process of making boron suboxid which consists in heating a mixture of about 7 to 8 parts of sodium borate and about one part of silicon to an elevated temperature to effect a reaction.

2. The process of making boron suboxid which consists in heating a mixture of about 7 to 8 parts of borax and about one part of silicon to about the boiling temperature of borax to effect reaction.

3. The process of preparing a sub-oxid of boron which consists in intimately mixing in a pulverized state a borate and an oxidizable silicon material and heating said mixture to the boiling point.

4. The process of preparing a sub-oxid of boron which consists in thoroughly mixing in a pulverized state an alkali borate and silicon, heating said mixture to the boiling point and treating with a solvent for silicon.

In witness whereof, I have hereunto set my hand this twenty fifth day of April, 1913.

EZECHIEL WEINTRAUB.

Witnesses:
JOHN A. McMANUS, Jr.,
ROBERT SHAND.